United States Patent [19]

Diener et al.

[11] Patent Number: 5,753,739
[45] Date of Patent: May 19, 1998

[54] AQUEOUS EMULSION OF CHLORINATED POLYOLEFINES, THE PREPARATION THEREOF, COATING AGENTS CONTAINING THEM AND THEIR USE

[75] Inventors: Wolfgang Diener, Wuppertal; Ronald Obloh, Dortmund; Reinhard Windmann, Wuppertal, all of Germany

[73] Assignee: Herberts GmbH, Wuppertal, Germany

[21] Appl. No.: 557,682

[22] Filed: Nov. 13, 1995

Related U.S. Application Data

[63] Continuation of Ser. No. 117,488, Sep. 7, 1993, abandoned.

[30] Foreign Application Priority Data

Sep. 8, 1992 [DE] Germany ............ 42 29 981.0

[51] Int. Cl.6 .................... C08K 3/20; C08L 63/00
[52] U.S. Cl. ................ 523/406; 523/414; 525/355
[58] Field of Search .................... 523/406, 414; 525/355

[56] References Cited

U.S. PATENT DOCUMENTS 5,218,031  6/1993  Nayder et al. ............ 523/406

FOREIGN PATENT DOCUMENTS 54-153832  12/1979  Japan.

*Primary Examiner*—Melvyn I. Marquis
*Assistant Examiner*—D. Aylward
*Attorney, Agent, or Firm*—Schweitzer Cornman Gross & Bondell LLP

[57] ABSTRACT

Aqueous emulsion of one or more water dilutable epoxide resins, containing 10 to 70 wt % of one or more epoxide resins 5 to 50 wt % of one or more organic solvents having a boiling point of 100° to 160° C., 10 to 70 wt % of water, and one or more chlorinated polyolefines in a weight ratio of epoxide resins:chlorinated polyolefine of 10:0.5 to 10:4.5, percentages by weight relating in each case to the total aqueous emulsion.

The emulsions can be used for the preparation of coating agents, especially for coating plastic substrates.

5 Claims, No Drawings

AQUEOUS EMULSION OF CHLORINATED POLYOLEFINES, THE PREPARATION THEREOF, COATING AGENTS CONTAINING THEM AND THEIR USE

This is a continuing application of U.S. Ser. No. 08/117,488, filed Sep. 7, 1993, now abandoned.

The invention refers to aqueous emulsions of chlorinated polyolefines containing one or more water dilutable epoxide resins. The emulsions are essentially or totally free from emulsifiers. They can be used for the preparation of coating agents, especially of two-component coating agents which are especially useful for coating plastic substrates.

Water dilutable two-component epoxide amine systems are known in industrial practice. They can e.g. be used for the protection against corrosion. It is possible to control the characteristics of the coating agents by the choice of the epoxide resins and the choice of the amine cross-linking agent. Such systems have a good protective effect against corrosion and they have a good adhesion on metals.

DE-A- 38 25 754 describes two-component epoxide amine systems which can be diluted with water. However, it is only possible to add a small amount of water providing a water content below 20%. Under the point of view of pollution, such compositions are not satisfying. A disadvantage of such coating agents is their reduced film-forming qualities at a high water content.

EP-A-0 319 841 describes aqueous two-component epoxide amine coating agents consisting of an aqueous dispersion of epoxide resins and as a second component of an oligomere urethane having terminal amino groups. The water solubility of the urethane is achieved by neutralization of the amino groups with acids.

It is common to such epoxide amine systems that they can be applied well on metal substrates; however they have no good adhesion on plastic substrates. After crosslinking the adhesion is especially bad on polyolefine substrates. Further the impact resistance under cold conditions of such coatings and such coated substrates is bad.

DE-A- 39 10 901 and the corresponding WO-90/12056 describe aqueous coating compositions for plastic material, containing water, a film-forming binder system, chlorinated polyolefines (CPO) as well as optional pigments and adjuvants. Acrylate resins and polyurethane resins are described as film-forming binders which can be in the form of aqueous emulsions. After application of the coating agents such systems dry physically. In order to prepare the coating agent it is necessary to use specific emulsifiers and a melt process for the chlorinated polyolefines; further it is necessary to carry out an azeotropic destination of all organic solvent components. This is very costly.

EP-A-0 466 136 describes specific aqueous coating agents for coating of plastic substrates containing a specific combination of polyolefine resins, urethane resins and epoxide resins. Emulsifiers are used for their preparation. An example for a usable olefine is chlorinated polypropylene.

It is the object of the present invention to provide aqueous coatings agents which are useful for coating of plastic moldings, especially in the automotive industry, such aqueous coating systems being stable at storage and having improved qualities during application.

It has now been found that this object can be achieved by providing an aqueous emulsion of water dilutable epoxide resins which is free from emulsifiers and which contains one or more chlorinated polyolefines. The emulsion can be used to prepare stable aqueous coating agents.

Therefore, the invention is concerned with an aqueous emulsion of one or more water dilutable epoxide resins, containing 10–70 wt % of one or more epoxide resins, 5–50 wt % of one or more organic, especially aromatic, solvents having a boiling point of 100° to 160° C., and 10–70 wt % of water, the percentages by weight relating in each case to the aqueous emulsion, as well as one or more chlorinated polyolefines in a weight ratio of epoxide resin:chlorinated polyolefine from 10:0.5 to 10:4.5, the emulsion being essentially or totally free from emulsifiers.

Further, the invention refers to aqueous coating agents containing the aqueous emulsion of the invention together with one or more water dilutable polyamine cross-linking agents, together with optional pigment fillers and conventional lacquer adjuvants and solvents and further optional epoxide resins and/or further different water dilutable binders. The coating agents are two-component systems (2K systems) containing the epoxides in one component and the polyamine crosslinkers in the other component.

In accordance with the invention it has been found that polyolefines, which are preferably dissolved in organic solvents, furnish, together with water dilutable epoxide resins and water, stable aqueous dispersions if they are dispersed well, which dispersions can be used in aqueous coating agents having a good adhesion on plastic substrates. Further, it has been found that the good adhesion on plastic substrates can be achieved without a previous additional adhesive coating. Further, it has been found that the flexibility of the coated substrates, especially under cold conditions, can be improved if the coating agents of the present invention are applied.

As an example, it is possible to prepare coating agents from the emulsions of the present invention by optional addition of a further water dilutable epoxide resin which can be the same or different and by further optional addition of pigments, fillers and conventional lacquer adjuvants. It is also possible to add additional binders and especially one or more aqueous or water dilutable polyamine resins. The viscosity of the coating agent ready for application can be adjusted to the desired range by dilution with water.

For example, it is possible to use commercial water dilutable di- or polyepoxides as epoxide binder component of the aqueous epoxide resin dispersions of the invention. They are film-forming epoxide resins which are available in the form of aqueous dispersions or as water dilutable resins.

Examples for such polyepoxides are polyglycidyl ethers on the basis of aliphatic or aromatic dioles, such as bisphenol-A, bisphenol-F, novolaks or polyalkylene glycols which are reacted via the functionl OH groups with compounds containing epoxide groups such as epichlorohydrin.

Further examples of polyepoxide compounds are the reaction products of aromatic diphenols with aromatic polycarboxylic acids, such as, e.g. phthalic acid or terephthalic acid or trimellithic acid, to form polyesters. The polyesters can, e.g. be reacted with 2.3-epoxy propanol-(1) to form the epoxide compounds.

Further examples are glycidyl functionalized (meth) acrylic polymers. In this case it is possible to introduce by polymerization glycidyl functional monomers, such as e.g. glycidyl (meth) acrylate or 1.2-epoxy butyl acrylate. Further it is, e.g possible to modify OH-containing acrylates after polymerization via the OH group with compounds containing polyepoxy groups. If desired, the qualities of the polymers can be modified by the introduction of further comonomers.

The expression (meth) acrylic which is used in the present specification and claims means methacrylic and/or acrylic.

It is possible to achieve water dilutability of the polyepoxides by hydrophilic ionic or non-ionic groups which are inserted by reaction. However, it is also possible to add portions of non-self-emulsifying epoxide resins to high molecular self-emulsifying epoxide resins and to transfer them together into the aqueous phase.

It has been found that the emulsions of the present invention can be prepared free from emulsifiers. However, it is also possible to add emulsifiers. However, it is convenient to keep the amount of external emulsifiers, which can be low molecular emulsifiers, as low as possible. As an example, the upper limit of the addition of such emulsifiers is 0.5 wt %, preferably less than 0.2 wt %, relating to the total weight of the emulsion. It is particularly preferable to keep the emulsions free from emulsifiers.

Examples for usable aqueous epoxide resin dispersions are also described in DE-A- 36 43 751, DE-A- 38 20 301, U.S. Pat. No. 4,886,845 or U.S. Pat. No. 4,987,163. They are modified epoxide resins on the basis of aromatic dioles which furnish stable aqueous dispersions without addition of emulsifiers.

The molecular weight (number average Mn) of the epoxide resins is preferably up to 50000; in the case of polyether epoxides and polyester epoxides it is preferably 500–10000; in the case of acrylate epoxide resins it is preferably 2000–20000. The epoxide equivalent of the binder is preferably 250–10000.

The epoxide resins are water dilutable. This can be achieved by insertion of hydrophilic groups by reaction, such as e.g. polyether structures, polyol structures or ionic groups. It is also possible to transfer the epoxide resins with additional ionic or non-ionic self-emulsifying epoxide resins into the aqueous phase. Polyepoxides on the basis of aromatic hydroxy compounds are preferred. The use of aqueous epoxide resin dispersions for the preparation of the emulsions of the invention is also preferred. It is particularly preferred to use epoxide resin dispersions which contain only self-emulsifying epoxide resins. If the preferred epoxide resin dispersions are used, it is preferable to use high viscous or solid epoxide resins.

It is possible to use commercial materials as chlorinated polyolefines. These are especially chlorinated polyethylenes, chlorinated polypropylenes or chlorinated copolymers thereof. It is also possible to use mixtures of such polymers. They have a degree of chlorination of 15–45 wt %. The molecular weight of the chlorinated polyolefines (CPO) is preferably 700–70000. They can be used in the form of powders, as an aqueous slurry or preferably as a solution in organic solvents. Preferably the solvents have a boiling range from 100°–160° C. Hydrocarbons, preferably aromatic hydrocarbons are especially suitable as solvents. The solids content of the preferred CPO solutions is 20–60 wt %.

The aqueous CPO/epoxide resin emulsion can be prepared by intensively disperging at least one water dilutable epoxide resin, as defined above, preferably a self-emulsifying epoxide resin or an aqueous epoxide resin emulsion, together with the chlorinated polyolefine in the form of a powder, slurry or organic solution. Fully demineralized water and optionally also parts of one or more solvents, especially aromatic solvents, are added, in order to achieve a suitable viscosity for disperging. The solution can be carried out in one step, however, it is also possible to do it in several steps or continuously. Since, normally, the viscosity for optimal dispersion is higher than a suitable storage viscosity, it is preferable to carry out a stepwise process. Disperging can be carried out using conventional dispersion and homogenization aggregates such as, e.g. impellers, rotor/stator mixers, high pressure homogenizators or ultrasonic homogenizators. In order to assist disperging, the temperature can be enhanced, e.g. up to 80° C.

In accordance with the invention, it has been found that chlorinated polyolefines can be emulsified by epoxide resins, such as epoxide resins used for the preparation of aqueous two-component coating agents on the basis of epoxide resins and amine resins. Thus, it is possible in accordance with the present invention to provide stable emulsions which can be used for aqueous coating agents on the basis of epoxide resins. If desired, it is also possible to use further epoxide resins in the coating agents.

The amount of chlorinated polyolefines is preferably 5–45 wt % relating to the epoxide resin, particularly preferred 20–40 wt %. The solvent content of the emulsions of the invention is preferably 10–200 wt %, especially preferred 40–100 wt %, relating to the epoxide resin solids content. The solids content of the aqueous dispersion is preferably 20–60 wt %. Preferably the dispersion is an oil-in-water dispersion.

The obtained aqueous CPO/epoxide resin dispersions are stable during storage. They can be used to prepare two-component (2K) coating agents on the basis of epoxide resins/amine cross-linking agents. The CPO/epoxide resin dispersions obtained in accordance with the present invention can be used as the epoxide resin component or as a part thereof. If desired, the dispersion can be added with the same or different water dilutable epoxide resins. It is preferred to use epoxide resins of the same type as the epoxide resins used for the preparation of the dispersion, e.g. the above described epoxide resins.

It is possible to use known polyamine cross-linking agents as described in the literature for the preparation of two-component coating agents. Their use is not limited. They contain reactive amino groups and optionally further functional groups which enhance the water solubility. The polyamines used as cross-linking agents can also have film-forming qualities. Thus, the polyamine cross-linking agents can be low molecular polyamines or polyamine resins.

The cross-linking agent has a sufficient amount of reactive groups. The equivalent weight per active H-atom is preferably 50 to 500, particularly preferred 100 to 400. The molecular weight can be broad as long as reactivity and water solubility are retained. Number average molecular weights (Mn) of 250 to 20000 are preferred.

The polyamine cross-linking component is water dilutable or water soluble. This can be achieved by the amount of polar groups, such as e.g. OH groups, amino groups, urea groups or polyether structures. The cross-linking component can be an aqueous dispersion or it can be used in a concentrated form, which can be diluted with water during application. Polyamines on an aliphatic basis are preferred.

Examples for suitable polyamines are diamines and amines having more than two amino groups, the amino groups being primary and/or secondary. Further the polyamines can be adducts consisting of polyamines having at least two primary amino groups which can be modified via further functional groups. Further, the polyamines can be polymers into which the amino-functional groups are inserted by reaction.

Examples for suitable polyamines are described in EP-A 0 240 083 or EP-A 0 346 982. Examples thereof are aliphatic and/or cycloaliphatic amines having 6–24 C-atoms containing 2–10 primary amino groups and 0–5 secondary amino groups. Representative examples are hexamethylene diamine, 1,2-diamino cyclohexane, isophoron diamine, diethylene triamine or polyether polyamines.

For example, the polyamine resins can also be polyfunctional amine components modified with di- or polyfunctional epoxy compounds, which can e.g. be prepared using diglycidyl or polyglycidyl ethers on the basis of bisphenol-A or bisphenol-F, polyglycidyl ethers of phenol formaldehyde or novolaks, glycidyl ethers of fatty acids having 6–24 C-atoms, epoxidized polybutadienes or glycidyl group containing resins such as polyesters or polyurethanes containing one or more glycidyl groups in the molecule. Such polyepoxide resins are then reacted with di- or polyamines, the amino groups being in excess. Thus, water dilutable binders are obtained.

Further, it is possible to use polyamine-isocyante adducts. Usual aliphatic, cycloaliphatic and/or aromatic di- or polyisocyanates are suitable. The reaction of the isocyanates with the polyamines can, e.g. be carried out in a temperature range from 20°–80° C., if desired, using low amounts of a catalyst. The polyamines are used in such an amount that after the reaction a sufficient amount of amino groups is maintained.

Examples for acryloyl unsaturated compounds for the preparation of the polyamine adducts which can be used in accordance with the invention are described in U.S. Pat. No. 4,303,563. Examples for polyamidoamines are described in EP-A 0 262 720. Further methods for the synthesis of amino-functionalised curing agents are described in EP-A 0 002 801 and EP-A 0 179 954. They are polyamines which are modified with unsaturated compounds or carboxylic acids.

Further, it is possible to add different water dilutable binders to the coating agents, e.g. water dilutable polyurethane resins or acrylate resins or polyester resins. Such additional binders shall not react with the cross-linking system epoxide/amine. Aqueous polymer dispersions are preferred, self-emulsifying or externally emulsifying polyurethane dispersions are particularly preferred. The additional binders can be present in the aqueous epoxide resin component or in the water dilutable amino component or in both components. It is also possible to use different additional binders in both components. Further, it is possible, however not necessary, to add cross-linking agents which only react during heating, such as e.g. blocked isocyanates or aminoplast resins. However, in the present case, they generally have no cross-linking function.

The coating agents of the invention are formulated as two-component systems; i.e. initially both components are provided and mixed immediately before application. One of the components of the a gents of the invention contains the epoxide resin, the second component contains the amino resins.

The epoxide resin component contains the dispersions of the invention and therefore also the CPO component. Further, it is possible to admix different or the same epoxide resins, optionally also pigments, binders and conventional lacquer adjuvants, such as defoaming agents, wetting agents, anticratering agents. It is necessary that the added compounds are compatible with the CPO/epoxide resin dispersion. The epoxide resin dispersion contains, as explained above, one or more organic, preferably aromatic solvents.

The pigments and the added components are well-dispersed and, if desired, also ground with the dispersion. This can be carried out in accordance with usual methods. It is also possible to grind the pigments separately in a wetting agent, in order not to impair the emulsion. The viscosity of the epoxide resin component is controlled in such a way that no sedimentation or phase separation occurs after long storage.

The second component, the cross-linking component, contains the polyamine resin. It is water dilutable or in the form of an aqueous component. If desired, the polyamine component can contain pigments, additives or further resin components. The resin components are in principle the same components which can also be additionlly contained in the epoxide resin component. They are water dilutable or preferably aqueous and they do not contain any groups which are reactive with the amine component. If desired, it is possible to add a small amount of a CPO solution to this component in order to improve the compatibility of both components of the coating agent.

As mentioned above, the epoxide resin component as well as the polyamine component can contain further resin components as additional binders. Examples for such additional binders are self-emulsifying polyurethane resins with anionic groups inserted by reaction, e.g. carboxyl groups. It is possible that such groups can at least be partially neutralized with the amino groups of the cross-linking component. Self-emulsifying, non-ionic polyurethane resins, containing hydrophilic groups, such as e.g. polyether groups, are particularly preferred.

The pigments can be usual pigments and fillers, e.g. organic or inorganic, such as e.g. titanium dioxide, aluminium silicate, barium sulfate or silica. Examples for conventional lacquer adjuvants are auxiliary materials such as antifoaming agents, flow-promoting agents, catalysts or anticratering agents. With such additives it is possible to obtain the desired qualities of the coating agents such as reactivity or flow. Further, it is possible to influence the conditions of preparation, application and storage.

It is possible to disperge the pigments in the amine component or in an additional binder which is used as a paste resin for the pigment. Disperging pigments and additives can be carried out in accordance with methods known to the person skilled in the art.

In order to prepare the coating agents, both components are mixed in such a way that the ratio of the reactive H-atoms of the cross-linking component to the epoxide groups of the epoxide component is 0.7:1 to 1.5:1 preferably 0.9:1 to 1.3:1. Additional binders are essentially not involved in the cross-linking reaction.

After mixing the components it is possible to adjust the viscosity of the coating agent by addition of water. The application of the coating agents can be carried out in different ways, e.g. by spraying, painting, dipping or rolling.

After application the coating agent crosslinks at temperatures from 10° to 120° C. A preferred temperature range is from 20° to 80° C. The crosslinking can be accelerated by addition of a catalyst.

Preferably, the coating agent contains 10 to 40 wt % of one or more organic solvents and 0.5 to 15 wt % CPO. The amount of film-forming epoxide resin and film-forming amine component is preferably 10 to 70 wt %, particularly preferred 15 to 55 wt %. The amount of additional binder is preferably up to 75 wt % relating to the amount of epoxide resin and amine resin, corresponding to a total amount up to 55 wt %. The water content is 20 to 70 wt %. The pigments content, referring to the total binder content, is e.g. 0 to 200 wt %.

A preferred version of the coating agent contains 20 to 35 wt % solvent, 2 to 10 wt % CPO, 20 to 45 wt % epoxide resin and amine component, 35 to 60 wt % water and 10 to 150 wt % pigments (the latter relating to the binder content).

The coating agents are preferably applied to plastic substrates. Examples are modified and non-modified polyolefines, especially polyethylene and polypropylene substrates, polycarbonates, polyamides, ABS-polymers, polyurethanes and polyesters. The cross-linking temperature can be chosen in accordance with the sensibility of the substrate against temperature.

The plastic substrates, which are obtained after crosslinking, have a homogene smooth surface which is free from defects. The adhesion at the substrate is good. The mechanical qualities of the coated object are not impaired, especially when it is cold. The flexibility and the breaking qualities of the coating layer on the substrate are improved. The obtained films have a high weatherability.

The obtained coatings can be formed with suitable pigments and one-layer finish-coating. Further, it is possible to apply one or more further coatings, e.g. transparent coatings. The thus obtained multilayer coatings show good adhesion to the substrate and good elasticity even when it is cold. They can be used without an additional adhesive primer. The coating agents are especially useful as basic layers in the automotive industry. However, it is also possible to use them for coating other substrates, such as plastic substrates, which are sensitive to temperature. The following examples explain the invention. Parts (P) as well as percentages relate to the weight unless otherwise stated.

A. PREPARATION OF AN EMULSION OF CHLORINATED POLYOLEFINES (CPO)

The following emulsions are prepared with a propellor agitator of 9000 rpm at 23° C., using an eccentric geometry of agitation. It is worked in such a way that no unagitated areas of the material are achieved. In each case the solutions of the chlorinated polyolefines are added slowly.

Example 1

30 P of 25% solution of chlorinated polypropylene having a chlorine content of 18% are added under agitation to 50 P of a 54% dispersion of an epoxide resin in accordance with example III.7 of DE-A 38 20 301 (solids content 43%).

Example 2

27.0 P of a 25% solution of a chlorinated polypropylene having a chlorine content of 18% are added under agitation to 50.5 P of a 54% dispersion of an epoxide resin according to example III.7 of DE-A 38 20 301 and to 2.5 P xylene (solids content 42.5%).

Example 3

32 P of a 32.5% solution of a chlorinated polypropylene having a chlorine content of 18% are added under agitation to 48 P of a 54% dispersion of an epoxide resin according to example III.3 of DE-A 38 20 301 (solids content 45.5%).

Example 4

75 P of a 10% solution of a chlorinated polypropylene having a chlorine content of 27% are added under agitation to 50 P of a 55.5% dispersion of an epoxide resin according to example II.1 of DE-A 36 43 751 and 14 P demineralized water (solids content 27%). The resulting epoxide resin/CPO emulsions are partly in the form of a paste and no longer have a thin viscosity. All of them have a high storage stability and no phase separation occurs.

B. PREPARATION OF A PIGMENTED POLYAMINE RESIN COMPONENT

Example 5

4.5% of an aliphatic polyamine (H-equivalent 245, viscosity 7000–9000 mPas, 100%; commercial product Beckopox® Spezialhärter VEH 2672) are homogenized with 2.0% dipropylene diglycol, 6.0% water and 2.0% of a commercial wetting agent. Under agitation 35.0% titanium dioxide, 3.5% aluminium silicate and 0.2% carbon black are added and disperged under cooling. After addition of 0.5% commercial defoaming agent and 4.0% water in order to adjust the viscosity, the product is ground for 20 minutes at 40° C. in a bead mill. During agitation, a mixture of 6.0 parts of a commercial CPO (40% in xylene) and 14.0% xylene admixed with 9.5% of a commercial polyamine (H-equivalent 160, viscosity 12 530 mPas; commercial product Beckopox® Spezialhärter EH 623) and 10.5% water are added. The viscosity of the obtained component is adjusted with 2% water.

Example 6

4.5% of an aliphatic polyamine as in example 5, (H-equivalent 245) are homogenized with 2.0% dipropylene diglycol, 6.0% water and 2.0% of a commercial wetting agent. Under agitation 35.0% titanium dioxide, 3.5% aluminium silicate and 0.2 carbon black are added under cooling. After addition of 0.5% of a commercial defoaming agent and 4.0% water in order to adjust the viscosity, the product is ground for 20 minutes at 40° C. in a bead mill. Under stirring, a mixture of 6.0 P of a commercial CPO (40% in xylene) admixed with 14.0% xylene, admixed with 6.8% of a commercial polyamine (H-equivalent 115, viscosity 20 000 mPas, 80%; commercial product Beckopox® Spezialhärter VEH 2133) is added together with 13.2% water, whereafter the viscosity of the mixture is adjusted with 2% water.

Example 7

4.5% of an aliphatic polyamine as in example 5 (H-equivalent 245) are homogenized with 2.0% dipropylene digylcol, 6.0% water and 2.0% of a commercial wetting agent. Under agitation 35.0% titanium dioxide, 3.5% aluminium silicate and 0.2% carbon black are added and disperged under cooling. After addition of 0.5% of a commercial defoaming agent and 4.0% water in order to adjust the viscosity, the product is ground for 20 minutes at 40° C. in a bead mill. 9.5% of a commercial polyamine (H-equivalent 160, viscosity 12 530 mPas, 80%; commercial product Beckopox® Spezialhärter EH 623) and stepwise changing 16.0% xylene and 15.0% water are admixed and the viscosity is adjusted with 1.8% water.

C. PREPARATION OF COATING AGENTS

Example 8

80 P of an emulsion of example 2 are homogenously mixed with 15 P water and 5 P of an epoxide resin according to example II.1 of DE-A 36 43 751. 50 P of a mixture according to example 5 are added to 50 P of this mixture. The spray viscosity is adjusted with about 2 P water.

Example 9

80 P of an emulsion of example 3 are homogenously mixed with 20 P water. 50 P of a mixture in accordance with example 5 are added to 50 P of this component. The spray viscosity is adjusted with about 2 P water.

Example 10

80 P of an emulsion of example 3 are homogenously mixed with 15 P water and 5 P of an epoxide resin according to example II.1 of DE-A 36 43 751. 50 P of a mixture according to example 6 are added to 50 P of this component. The spray viscosity is adjusted with about 2 P water.

Example 11

80 P of an emulsion according to example 2 are homogenously mixed with 15 P and 5 P of an epoxide resin according to example III.7 of DE-A 38 20 301. 50 P of a mixture according to example 7 are added to 50 P of this component. The spray viscosity is adjusted with a low amount of water.

D. PREPARATION OF ADHESIVE PRIMERS

The resulting primer coating agents are sprayed on to a degreased substrate (Hostalen PPN 8018B® of Hoechst AG) in a dry film thickness of about 30–40 μm. After an aeration period of 10 minutes, the film is dried at 90° C. for 30 minutes. Thereafter a usual multilayer coating can be prepared:
Multilayer Coating:

- 35 μm two-component primer according to examples 8–11
- 15 μm commercial water-based lacquer (Diamantsilber 65 120, Herberts GmbH)
- 35 μm commercial two-component transparent lacquer (47891 Herberts GmbH)

An examination of humidity resistance (DIN 50017, condensed water examination climate, adhesion to the following layers) and an examination of the elasticity (breakthrough DIN 53443, part 2, adhesion to the substrate) show, even at −20° C., good results.

A comparative test was carried out in accordance with example 11, however, without addition of the CPO polymer to the coating agent. A further comparative test was carried out using a solvent content of xylene under 5%. Both tests showed a remarkably worse result at the examination of adhesion.

I claim:

1. A process for coating plastic substrates which comprises applying to said substrate an aqueous coating composition having good adhesion to said plastic substrate comprising 10–70% by weight of one or more epoxide resins containing epoxide groups, 5–70% by weight of one or more organic solvents having a boiling point of 100°–160° C., 10–70% by weight of water, and one or more chlorinated polyolefins with the weight ratio of epoxide resin and one or more water dilutable polyamine cross linking agents:chlorinated polyolefin being 10:0.5 to 10:4.5, the percentages being based on the total aqueous emulsion.

2. The process of claim 1 wherein said aqueous coating composition is essentially free of emulsifiers other than said epoxide resins.

3. The process of claim 1 wherein said organic solvent is an aromatic solvent.

4. The process of claim 1 wherein said epoxide resins are self-emulsifying epoxide resins.

5. The process of claim 1 wherein said plastic substrate comprises polypropylene.

* * * * *